United States Patent
Pupin et al.

(10) Patent No.: US 8,983,717 B2
(45) Date of Patent: Mar. 17, 2015

(54) VEHICLE CAMERA SYSTEM OPERABLE IN OFF-ROAD MODE AND METHOD

(75) Inventors: Anthony Pupin, Farmington Hills, MI (US); Maher Ghneim, Livonia, MI (US); Thomas Richard Wroblewski, South Lyon, MI (US); Hermann J. Salenbauch, Bloomfield Hills, MI (US); Benny Vann, Farmington Hills, MI (US); Noah Barlow Mass, Ann Arbor, MI (US); Kerry Peter Baldori, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 798 days.

(21) Appl. No.: 12/974,595

(22) Filed: Dec. 21, 2010

(65) Prior Publication Data

US 2012/0158243 A1    Jun. 21, 2012

(51) Int. Cl.
G06F 7/00 (2006.01)
B62D 15/02 (2006.01)
H04N 7/18 (2006.01)

(52) U.S. Cl.
CPC ............ B62D 15/0295 (2013.01); H04N 7/181 (2013.01)
USPC ............................................. 701/36; 701/45

(58) Field of Classification Search
USPC .................. 701/1, 36, 41, 50, 70, 82, 300
See application file for complete search history.

(56) References Cited

U.S. PATENT DOCUMENTS

| | | | | |
|---|---|---|---|---|
| 5,337,846 A * | 8/1994 | Ogaki et al. | | 180/8.2 |
| 5,666,227 A * | 9/1997 | Ben-Ghiath | | 359/630 |
| 5,670,935 A * | 9/1997 | Schofield et al. | | 340/461 |
| 6,424,273 B1 | 7/2002 | Gutta et al. | | |
| 6,580,373 B1 | 6/2003 | Ohashi | | |
| 6,798,343 B2 * | 9/2004 | Carrier et al. | | 340/539.13 |
| 6,954,152 B1 | 10/2005 | Matthews | | |
| 7,053,761 B2 | 5/2006 | Schofield et al. | | |
| 7,092,007 B2 * | 8/2006 | Eguchi et al. | | 348/148 |
| 7,161,616 B1 | 1/2007 | Okamoto et al. | | |
| 7,176,959 B2 * | 2/2007 | Sato et al. | | 348/148 |
| 7,266,219 B2 | 9/2007 | Okamoto et al. | | |
| 7,391,014 B2 * | 6/2008 | Saccagno | | 250/239 |
| 7,463,974 B2 * | 12/2008 | Morita et al. | | 701/442 |

(Continued)

FOREIGN PATENT DOCUMENTS

| | | |
|---|---|---|
| JP | 2004224227 A | 8/2004 |
| JP | 200750712 A | 3/2007 |
| JP | 200874139 A | 4/2008 |

OTHER PUBLICATIONS

"Camera Monitor Systems on Vehicles—Heavy Eq./Trucks—Heavy Equipment," www.orlaco.com/off-road-english.htm, Orlaco Specialised Camera Solutions, 4 pages, Copyright 2010.

(Continued)

*Primary Examiner* — Nicholas Kiswanto
(74) *Attorney, Agent, or Firm* — Frank MacKenzie; Price Heneveld LLP

(57) ABSTRACT

A camera system and method of assisting a driver of vehicle for off-road mode use is provided. The camera system includes one or more cameras located on the vehicle to generate images of ground near the vehicle. The generated images are displayed to the driver when the vehicle is detected to be operating off-road and are prevented from being displayed when not off-road. A steering wheel direction indicator may also be displayed to the driver.

20 Claims, 4 Drawing Sheets

(56) References Cited

U.S. PATENT DOCUMENTS

| | | | |
|---|---|---|---|
| 7,914,187 B2* | 3/2011 | Higgins-Luthman et al. | 362/465 |
| 7,965,871 B2* | 6/2011 | Ihara et al. | 382/107 |
| 8,009,868 B2* | 8/2011 | Abe | 382/104 |
| 8,139,109 B2* | 3/2012 | Schmiedel et al. | 348/118 |
| 8,160,781 B2* | 4/2012 | Naono et al. | 701/48 |
| 8,284,995 B2* | 10/2012 | Diaz et al. | 382/104 |
| 8,319,617 B2* | 11/2012 | Ohshima et al. | 340/435 |
| 2002/0113873 A1* | 8/2002 | Williams | 348/118 |
| 2004/0176890 A1* | 9/2004 | Acker et al. | 701/38 |
| 2005/0015201 A1 | 1/2005 | Fields et al. | |
| 2006/0119473 A1* | 6/2006 | Gunderson et al. | 340/435 |
| 2006/0132601 A1 | 6/2006 | Kukita et al. | |
| 2007/0032913 A1* | 2/2007 | Ghoneim et al. | 701/1 |
| 2007/0291130 A1 | 12/2007 | Broggi et al. | |
| 2009/0009604 A1 | 1/2009 | Kanaoka et al. | |
| 2009/0228175 A1* | 9/2009 | Borgesson | 701/48 |
| 2010/0019934 A1 | 1/2010 | Takano | |
| 2010/0211582 A1* | 8/2010 | Kotski et al. | 707/756 |
| 2011/0181728 A1* | 7/2011 | Tieman et al. | 348/148 |

OTHER PUBLICATIONS

"Total Vision® Camera System," www.bajataco.com/totalvision/totalvision01.html, Total Vision, 2 pages, www.bajataco.com—Copyright 2002-2009.

"Landcruiser Prado: Prepare for Anything!," www.southsidetoyota.com.au/newlandcruiserprado.htm, 5 pages, Copyright 2010.

* cited by examiner

VEHICLE CAMERA SYSTEM OPERABLE IN OFF-ROAD MODE AND METHOD

FIELD OF THE INVENTION

The present invention generally relates to camera imaging systems located onboard vehicles, and more particularly relates to a vehicle imaging system for off-road use to assist with operation of the vehicle.

BACKGROUND OF THE INVENTION

Many off-road automotive vehicles are configured with a relatively high ground clearance sufficient to clear obstacles which reduces the driver's ability to see the ground terrain in front of the vehicle when viewed from the driver's seating position. Elevated obstacle clearance results in the diminished visibility of the nearby terrain and any obstacles immediately around the vehicle, such as boulders, cliffs, protrusions and the like which may be commonly present in an off-road driving environment. In some situations, travel on rugged off-road trails may require the assistance of a "spotter" who stands outside of the vehicle to assist the driver as the driver negotiates the vehicle to crawl over and around obstacles on the rugged terrain or narrow trails. It would be desirable to provide for enhanced tools for effectively allowing a driver of the vehicle to negotiate rugged terrain with reduced or no need for a spotter.

SUMMARY OF THE INVENTION

According to one aspect of the present invention, a vehicle camera system is provided. The system includes a camera located on a vehicle and oriented to generate images of ground near the vehicle. The system also includes a display configured to display the images for viewing by a driver of the vehicle. The system further includes an off-road enabling input for providing an indication that the vehicle is in an off-road mode. The system further includes a controller for controlling the display to display the images when in the off-road mode.

According to another aspect of the present invention, a vehicle camera system is provided with a steering wheel direction indicator. The system includes a camera mounted to a vehicle and oriented to generate images of ground near the vehicle. The system also includes a steering wheel input for receiving a steering signal indicative of direction of the steering wheel. The system further includes a display configured to display the images and a directional indicator of the steering wheel based on the steering signal for viewing by a driver of the vehicle.

According to a further aspect of the present invention, a method of assisting a driver of a vehicle with imagery during off-road driving is provided. The method includes the steps of generating images of ground near a vehicle using a camera and detecting an off-road mode of the vehicle. The method also includes the step of displaying the generated images to a driver of the vehicle when the off-road mode is detected. The method further includes the step of preventing the display of the generated images when the vehicle is not in the off-road mode.

According to yet a further aspect of the present invention, a method of assisting a driver of a vehicle with imagery and a steering wheel indication is provided. The method includes the steps of generating images of ground near a vehicle using a camera and detecting a direction of steering of the vehicle. The method also includes the step of displaying the generated images on a display to a driver of the vehicle. The method further includes the step of displaying a steering indicator on the display based on the detected direction of steering.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
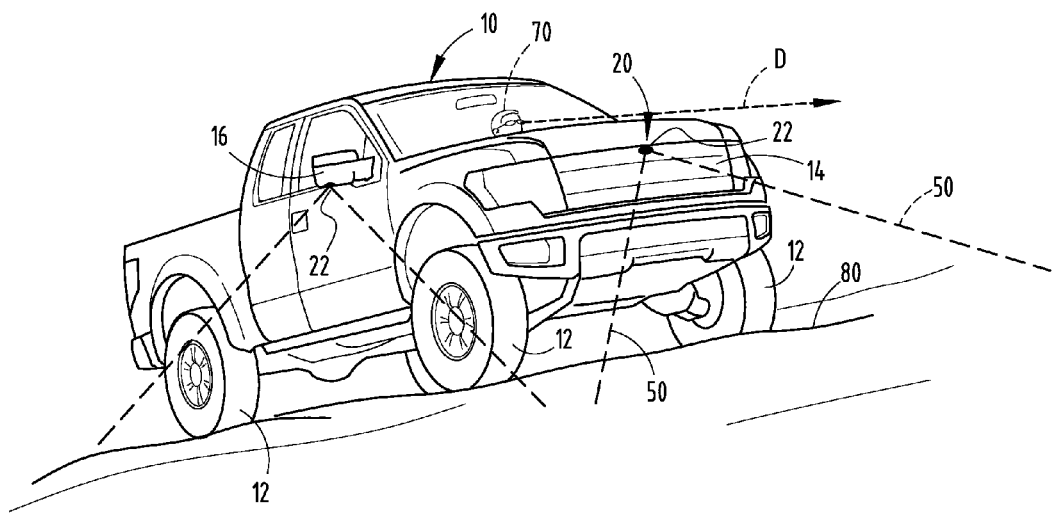
FIG. 1 is a perspective view of a vehicle driving in off-road mode on ground terrain and having a camera system, according to one embodiment.
Figure 2:
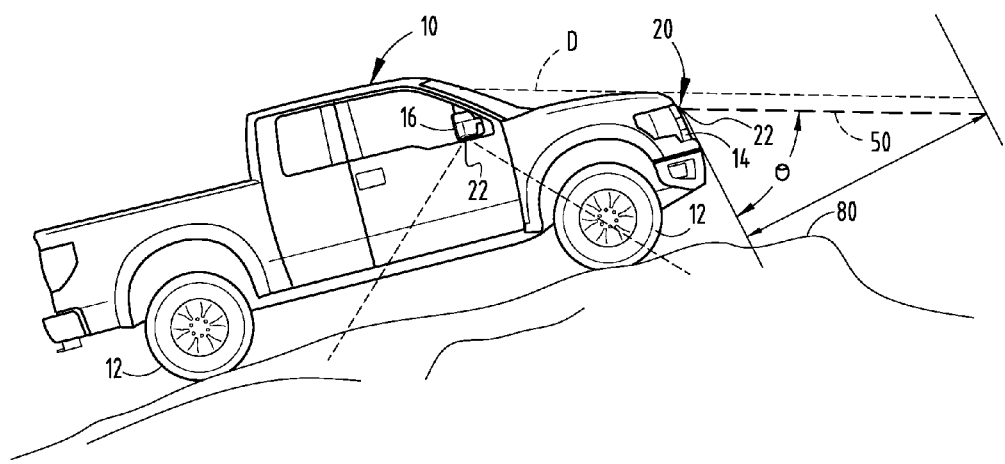
FIG. 2 is a side view of the vehicle driving in off-road mode on rough terrain and having the camera system of FIG. 1.
Figure 3:
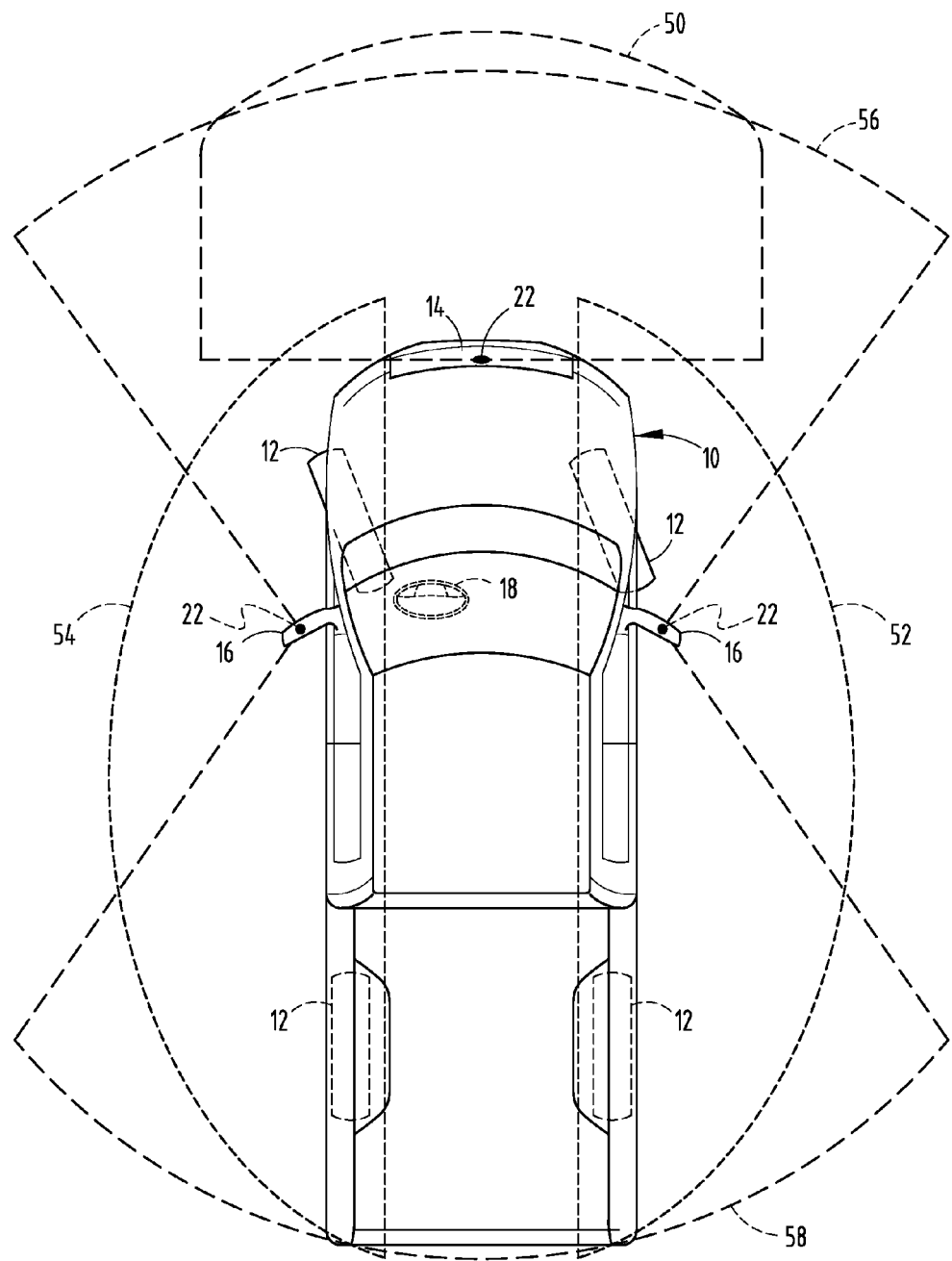
FIG. 3 is a top view of the vehicle and camera system illustrating various camera fields of view, according to various embodiments.

For purposes of description herein, the terms "upper," "lower," "right," "left," "rear," "front," "vertical," "horizontal," and derivatives thereof shall relate to the vehicle and camera system as oriented in FIGS. 1-3. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a wheeled automotive vehicle 10 having four wheels 12 is generally illustrated maneuvering the ground terrain 80 in an off-road driving environment. The vehicle 10 has a camera system 20 to assist with operation of the vehicle off-road while operating in an off-road mode. The camera system has one or more cameras for capturing images of the ground terrain 80 near the vehicle 10 and provides a display of the ground terrain 80 with a steering wheel indicator for viewing by the driver 70 of the vehicle 10 to assist with off-road driving. The camera system 20 may be used on any vehicle capable of operating on the off-road environment including but not limited to trucks, sport utility vehicles (SUVs), four-wheelers, tractors and other off-road capable vehicles. "Off-road" is defined herein as terrain not covered by a paved roadway or well maintained gravel roadway and typically includes a rugged terrain. "Off-road mode" is defined herein as an operating mode in which the vehicle 10 is expected or determined to be operating off-road.

In the embodiment shown and described herein, the wheeled vehicle 10 is driven by a driver 70 controlling the acceleration, braking and related controls, and operating a steering wheel 18 to turn the front steered wheels 12 between left and right angular positions in a desired direction to maneuver the vehicle 10 on a desired path on the ground terrain 80. The ground terrain 80 in an off-road mode environment may include steep inclines and declines, large rocks or boulders, large ruts, logs and other obstacles that the driver 70 of the vehicle 10 may appreciate viewing while driving the vehicle 10. The camera system 20 provides a display of captured images of the ground terrain 80 near the vehicle 10 such that the driver 70 of the vehicle 10 can view the ground terrain 80 via the display to assist with driving of the vehicle 10 when operating in the off-road mode. The camera system 20 further provides a steering wheel indicator overlayed on the displayed images that indicates direction of the steering wheel 18. The steering wheel indicator may include three dynamic lines appended on the display which may show hill inclinations.

The camera system 20 is shown in FIGS. 1-3 having a one or more cameras 22 located on the vehicle 10 and oriented to capture video images of the ground terrain 80 near the vehicle 10. The camera system 20 includes a first camera 22 shown located in an opening provided in the front grille 14 of the vehicle 10 just below the vehicle hood. The first camera 22 captures images in a viewing window 50 generally forward and downward in front of the vehicle 10 to capture images of the ground terrain 18 forward of the vehicle 10 and its front wheels 12. The first camera 22 located at the front of the vehicle 10 may have an angle θ of less than ninety degrees) (90°), and more preferably of about zero to sixty degrees (0° to 60°). The angle θ may be dependent upon the camera orientation relative to the front bumper or other vehicle obstruction. The first camera 22 captures the ground terrain 80 just in front of the vehicle 10 and its front tires 22 and covers a forward distance sufficient to cover the ground terrain 80 that the driver 70 of the vehicle 10 may be prevented from otherwise viewing. Thus, the driver 70 of the vehicle 10 is able to view the captured images on a display. This enables a driver to view images of the ground which the driver may not otherwise be able to view below the driver's line of sight axis D given height of the vehicle 10, size of the vehicle hood, seating height of the driver and shape of the ground terrain 80.

According to one embodiment, the vehicle 10 has a first camera 22 located on or near the front of the vehicle for generating images forward of the vehicle. However, it should be appreciated that the camera system 20 may include one or more cameras 22. According to another embodiment, the vehicle 10 may include three cameras, including the first camera 22 located in the front grille 14 and second and third cameras located on left and right sides of the vehicle 10, such as in the exterior rearview mirror housing 16, and positioned to generate images along opposite sides of the vehicle 10. As seen in FIG. 3, the exterior side view mirror housing mounted cameras 22 may each generate images within a viewing window 52 along the corresponding sides of the vehicle 10 such that the ground terrain adjacent the sides of the vehicle 10 is substantially covered. According to a further embodiment, the camera system 20 includes five cameras 22, including two cameras located in each of the exterior side view mirror housings 16 in which one side view mounted camera generates a forward camera window 56 and a second of the cameras 22 of the rearview mirror generates a rearward facing field of view window 58 adjacent the corresponding side of the vehicle 10 as seen in FIG. 3. It should be appreciated that one or more cameras 22 may be employed to generate images in various shapes and size windows capturing the ground terrain 18 near the vehicle 10 that may be displayed to an operator of the vehicle 10 while the vehicle 10 is operating in the off-road mode. Each camera(s) 22 may continually generate successive video images at high or slow imaging rates such as to provide real time video images. One example of the camera(s) 22 may include a 4×3 NTSC type camera system (processing visible light).

Figure 4:
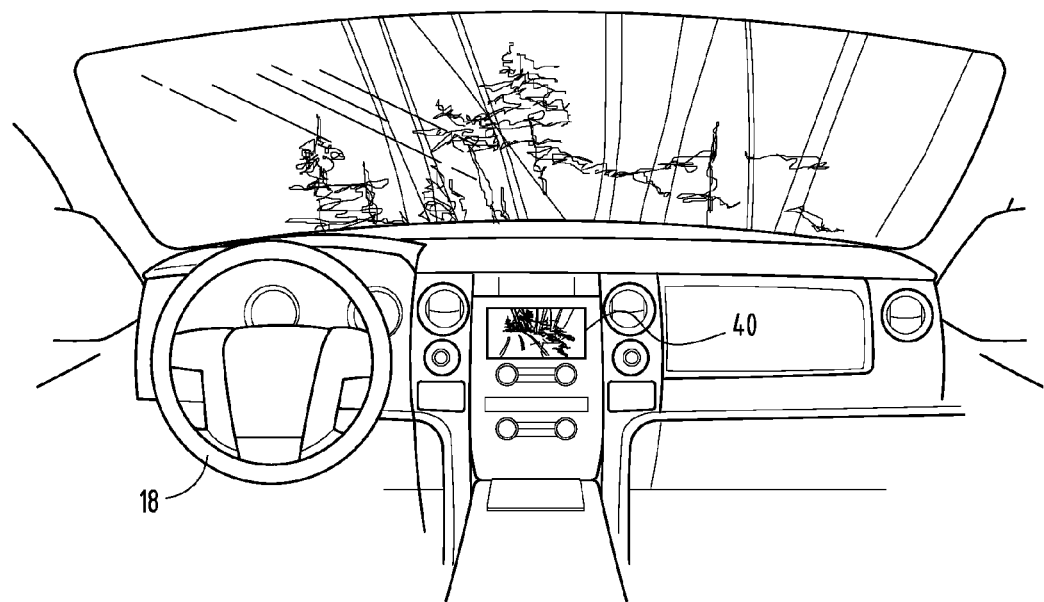
FIG. 4 is a forward facing perspective view of the vehicle passenger compartment showing a display for displaying images of the camera, according to one embodiment.
Figure 5:
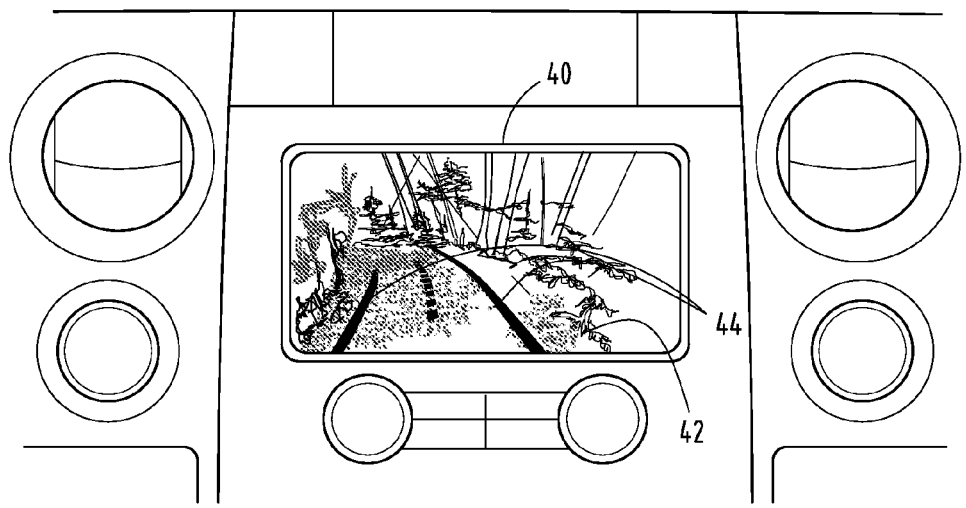
FIG. 5 is an enlarged view of the display further illustrating the presentation of images and a steering wheel direction indicator.

Referring to FIGS. 4 and 5, the camera system 20 is shown having a display 40 for displaying images captured with the one or more cameras 22. The display 40 is shown located in the passenger compartment of the vehicle 10 in a position viewable by the driver 70 of the vehicle 10 seated in front of the steering wheel 18. In the embodiment shown, the display 40 may be a display readily made available on the vehicle 10 such as the shared display for an entertainment/infotainment system that may provide navigation information, audio information, and other entertainment and information. It should be appreciated that the display 40 may be located elsewhere in the vehicle 10 and otherwise viewable by the driver 70 of the vehicle 10 and may be fixedly installed in the vehicle 10 or otherwise added as an accessory.

The display 40 is shown in FIG. 5 providing a camera generated image of the ground terrain in front of the vehicle 10. The displayed image provides a view of the ground terrain forward of the vehicle in the embodiment shown. For embodiments with more than one camera, the captured images from plural cameras may be presented together on the display at the same time or an operator may select one camera for viewing at a time. The driver 70 of the vehicle 10 is able to view the ground forward of the vehicle 10 as the vehicle 10 maneuvers on the rugged off-road terrain. In addition, the display 40 presents a steering wheel indicator 44 in the form of lines that overlay the image, according to one embodiment. The steering wheel indicator 44 may be shown as a pair of substantially parallel border lines or projection guide lines that project on an anticipated travel path of the vehicle based on the steering wheel position. The lines may be curved as shown with or without a center dotted line. The steering wheel indicator 44 provides an indication of the pointing direction of the steering wheel 18 and thus the anticipated steered path of the vehicle 10 based on a steering wheel input. Accordingly, the driver 70 of the vehicle 10 may view the ground forward of the vehicle 10 in the displayed images and may also view the steering direction of the steering wheel 18 so as to be able to determine the path that the vehicle 10 is expected to travel based on the steering wheel direction.

Figure 6:
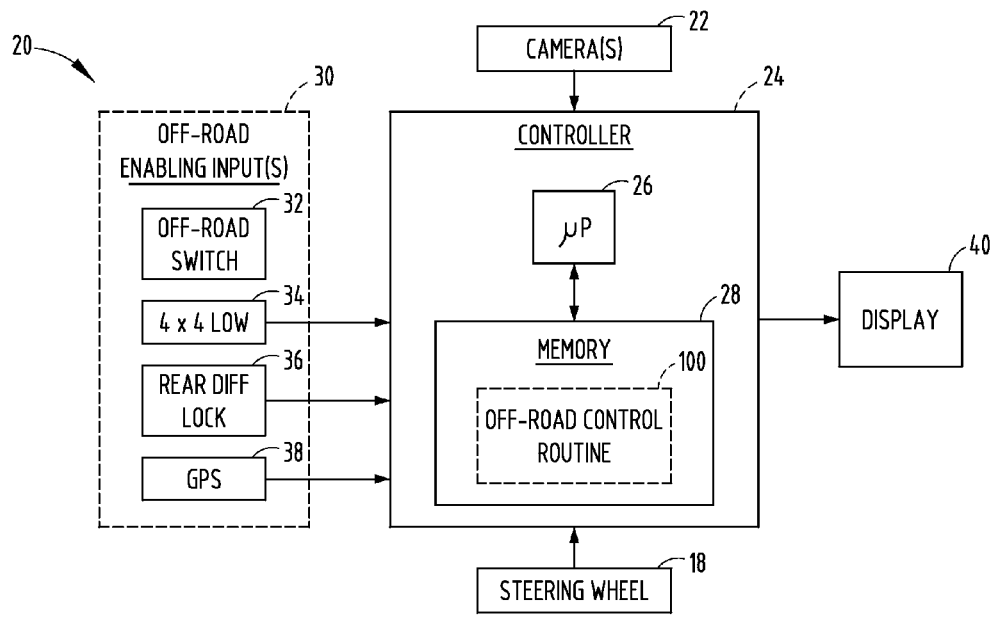
FIG. 6 is a block diagram illustrating the vehicle camera system, according to one embodiment.

Referring to FIG. 6, the camera system 20 is generally illustrated having a controller 24 for receiving various inputs and controlling outputs presented on the display 40 to the driver of the vehicle 10. The controller 24 includes control circuitry such as a microprocessor 26 and memory 28. It should be appreciated that any suitable digital and/or analog control circuitry may be employed as the controller 20. Memory 28 may include random access memory (RAM), read-only memory (ROM), electronically erasable programmable read-only memory (EEPROM), flash memory and other volatile and non-volatile memory storage medium.

The controller 24 controls the display 40 such that the camera generated images are presented or displayed on the display 40 when the vehicle 10 is determined or expected to be in the off-road mode and prevents the display of the images when the vehicle is not in the off-road mode. Additionally, the controller 24 receives one or more off-road enabling inputs 30 which are indicative of the vehicle operating or expected to be operating in an off-road mode. The off-road enabling inputs 30 may include a user actuated off-road switch 32 which is user actuated to place the vehicle 10 in an off-road mode. The switch 32 may be a stand-alone switch or may be user selectable from a menu. Another off-road enabling input 30 may include the 4×4 low gear selector 34 which places the vehicle transmission in the 4×4 low gear which is indicative of the vehicle expected to be traveling in an off-road mode. Another off-road enabling input 30 may include a rear differential lock in which the rear differential of the vehicle 10 is locked and may be used as an indicator of an off-road mode. A further off-road enabling input 30 may include a global position system (GPS) receiver which determines the position of the vehicle and, in comparing the position relative to map data, determines whether the vehicle 10 is operating on a roadway or off of a roadway indicative of an off-road mode. The GPS receiver 38 may be used in conjunction with navigation map data commonly found on many vehicle employed navigation systems.

The controller 24 processes one or more of the off-road enabling inputs and a software off-road control routine 100 stored in memory 28 to determine if the vehicle is in an off-road mode, and, if so, allows for the presentation of video images generated by one or more of the cameras 22 for viewing by the driver on display 40 so as to assist the driver of the vehicle in maneuvering the vehicle. The software off-road control routine 100 is a software interlock control routine which controls and permits the display of the camera generated camera images when the vehicle is being operated in an off-road mode, and prevents the display of the camera generated images when the vehicle is not in an off-road mode. The driver assist images displayed by the camera system 20 are only available during the off-road mode and the vehicle remains legal for public highway use in which imaging data is prevented from being presented on the display to the driver of the vehicle. The software interlock therefore allows operation of the cameras and displayed image while still allowing the vehicle to be operated on public roadways in compliance with driving laws and regulations.

The controller 24 is further shown receiving an input from the steering wheel 18. The steering wheel input 18 provides an indication of the pointing direction of the steering wheel which indicates the direction that the steered wheels 12 are pointing and hence the expected vehicle travel path. The controller 24 processes the steering wheel input 18 and software interlock routine 100 and provides a steering wheel indicator, e.g., guidelines, as an overlay onto the acquired images for presentation on the display 40. Accordingly, by making the steering wheel indicator viewable to the driver of the vehicle, the driver may view the ground forward of the vehicle 10 and also the direction in which the steered wheels are pointed so as to more accurately maneuver the vehicle 10 in the off-road mode and to avoid obstacles and hazards. The camera system 20 may enhance visibility in order to increase safety.

The camera system 20 may employ one or more cameras to view the position and direction of the vehicle tires, in order to enable and make effective the activity known as "rock crawling." This may be achieved by the camera system 20 displaying the captured images of the vehicle tires on the terrain. Additionally, the camera system 20 may include a zoom function which may be implemented with zoom actuator buttons on the touchscreen display. Accordingly, a user may zoom in or zoom out of the camera images to enlarge or minimize, respectively, the acquired images. Further, the camera system 20 may further provide pan and tilt features.

Figure 7:
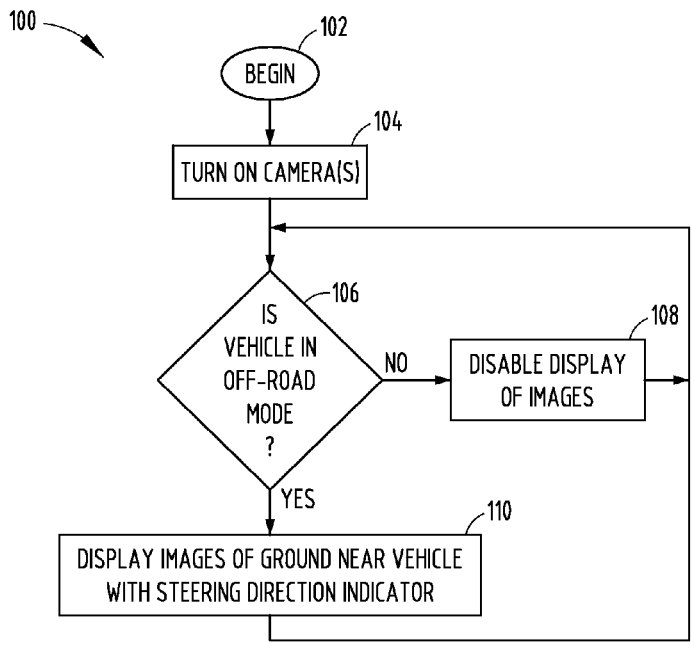
FIG. 7 is a flow diagram illustrating a routine for controlling the camera system, according to one embodiment.

The camera system 20 is further shown having the off-road control routine 100 stored in memory 28 and executable by a microprocessor 26. One embodiment of the control routine 100 is shown in FIG. 7 beginning at step 102. Routine 100 turns on the camera or plural cameras at step 104. At decision step 106, routine 100 determines if the vehicle is in an off-road mode. If the vehicle is determined not to be in an off-road mode, routine 100 disables the display of the camera generated images on the display at step 108. If the vehicle is determined to be in the off-road mode, routine 100 allows for the display of images of the ground near the vehicle on the display at step 110. Additionally, routine 100 provides for the steering direction indicator to also be presented with the display.

Accordingly, the vehicle camera system 20 advantageously provides video or camera generated images for display to a driver 70 of vehicle 10 while the vehicle 10 is operated in an off-road mode. The images presented on the display allow the driver to maneuver the vehicle 10 over rugged terrain without requiring the use of a spotter. Additionally, the driver of the vehicle is able to view the anticipated travel path with the steering wheel indicator indicative of the direction of steering of the wheels so as to further enhance the driving experience.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle camera system comprising:
   a camera located on a vehicle and oriented to generate images of ground forward of the vehicle;
   a display configured to display the images for viewing by a driver of the vehicle;
   an off-road enabling input for providing an indication that the vehicle is in an off-road mode; and
   a controller for controlling the display to display the images of ground only when the vehicle is in the off-road mode.

2. The system as defined in claim 1, wherein the off-road enabling input comprises a user actuated switch.

3. The system as defined in claim 1, wherein the off-road enabling input comprises a four wheel drive low gear input.

4. The system as defined in claim 1, wherein the off-road enabling input comprises a global positioning system (GPS) signal for providing a position of the vehicle relative to map data.

5. The system as defined in claim 1, wherein the camera comprises a first camera located in the vicinity of a grille of the front of the vehicle.

6. The system as defined in claim 5, wherein the camera further comprises a second camera located on an exterior rearview mirror housing for displaying images near a road tire of the vehicle.

7. The system as defined in claim 1 further comprising a steering wheel input receiving a steering signal indicative of a direction of the steering wheel, wherein the display provides a directional indicator comprising one or more lines overlayed on the image to indicate the direction of a steering wheel based on the steering signal.

8. A vehicle camera system comprising:
   a camera mounted to a vehicle and oriented to generate images of ground near the vehicle;
   a steering wheel input for receiving a steering signal indicative of direction of a steering wheel; and
   a display configured to display the images of ground and a directional indicator comprising a line indicating a pointing direction of the steering wheel based on the steering signal for viewing by a driver of the vehicle.

9. The system as defined in claim 8 further comprising a controller and an off-road enabling input for generating a signal indicative of the vehicle operating in an off-road mode, wherein the controller disables presentation of images on the display viewable by the driver when the vehicle is not in an off-road mode and enables generation of images on the display viewable by the driver when the vehicle is in an off-road mode.

10. The system as defined in claim 9, wherein the off-road enabling input comprises a four-wheel drive low gear input.

11. The system as defined in claim 9, wherein the off-road enabling input comprises a user activated switch.

12. The system as defined in claim 9, wherein the off-road enabling input comprises a global positioning system (GPS) input for providing a position of the vehicle relative to map data.

13. The system as defined in claim 8, wherein the camera comprises a first camera located in the vicinity of a grille of the front of the vehicle.

14. The system as defined in claim 13, wherein the camera further comprises a second camera located on an exterior rear view mirror housing for displaying images near a road tire of the vehicle.

15. A method of assisting a driver of a vehicle with imagery during off-road driving comprising:
    generating images of ground forward of the vehicle using a camera;
    detecting an off-road mode of the vehicle;
    displaying the generated images to the driver of the vehicle when the off-road mode is detected; and
    preventing the display of the generated images of ground when the vehicle is not in the off-road mode.

16. The method as defined in claim 15, wherein the step of generating images comprises generating first images of ground forward of the vehicle generated by a first camera and generating second images of ground near the vehicle with a second camera located on an exterior rearview mirror housing.

17. The method as defined in claim 15 further comprising the step of receiving a steering wheel signal indicative of a direction of a steering wheel and displaying a directional indicator on the display indicative of the direction of the steering wheel.

18. The method as defined in claim 15, wherein the step of detecting an off-road mode comprises detecting one of a user activated switch input, a four-wheel drive low gear input, and a GPS determined location signal.

19. A method of assisting a driver of a vehicle with imagery comprising:
    generating images of ground near the vehicle using a camera;
    detecting a pointing direction of steering of the vehicle;
    displaying the generated images on a display to the driver of the vehicle; and
    displaying a steering indicator comprising one or more lines overlaying the images on the display indicative of the detected pointing direction of steering.

20. The method as defined in claim 19 further comprising the steps of:
    detecting an off-road mode of the vehicle;
    displaying the generated images to the driver of the vehicle when the off-road mode is detected; and
    preventing the display of the generated images to the driver when the vehicle is not in the off-road mode.

* * * * *